C. E. LORD.
THREE WIRE DYNAMO ELECTRIC MACHINE.
APPLICATION FILED JUNE 7, 1909.
996,266.
Patented June 27, 1911.
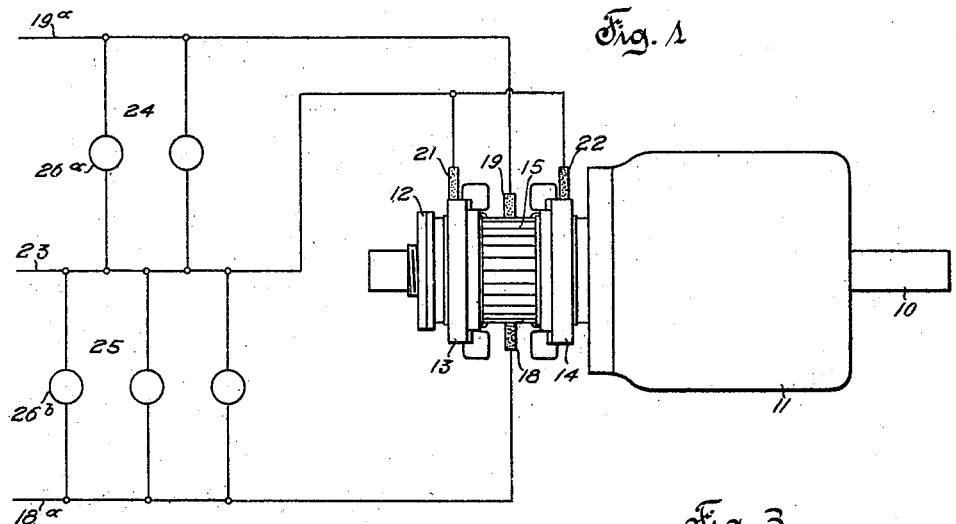
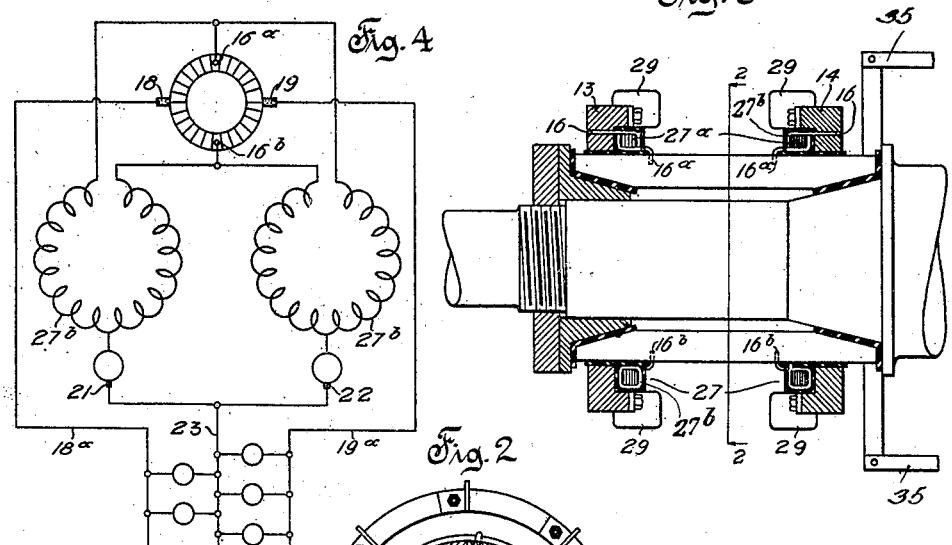
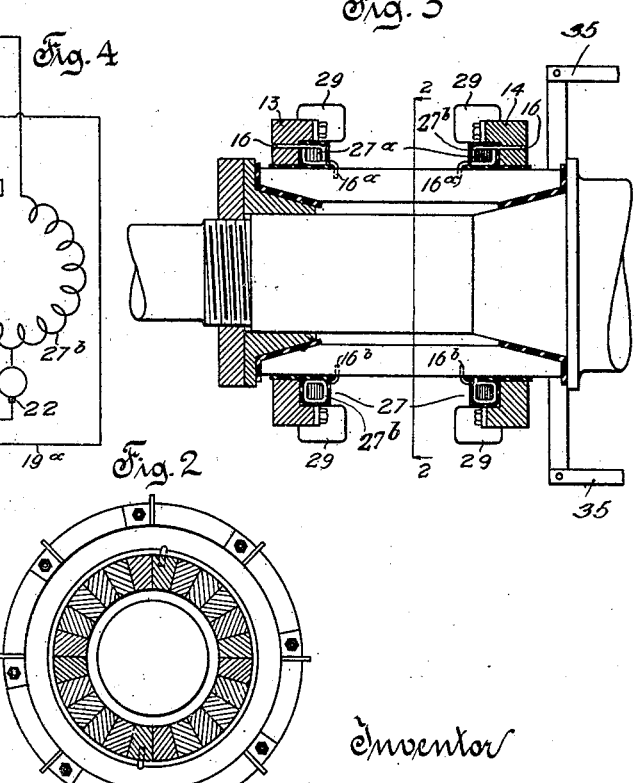
Witnesses
Rob. E. Stoll
Chas. L. Byron
Inventor
Chas. E. Lord

UNITED STATES PATENT OFFICE.

CHARLES E. LORD, OF MILWAUKEE, WISCONSIN, ASSIGNOR TO ALLIS-CHALMERS COMPANY, A CORPORATION OF NEW JERSEY.

THREE-WIRE DYNAMO-ELECTRIC MACHINE.

996,266.  Specification of Letters Patent.  Patented June 27, 1911.

Application filed June 7, 1909. Serial No. 500,678.

*To all whom it may concern:*

Be it known that I, CHARLES E. LORD, a citizen of the United States, residing at Milwaukee, in the county of Milwaukee and State of Wisconsin, have invented certain new and useful Improvements in Three-Wire Dynamo-Electric Machines, of which the following is a full, clear, and exact specification.

My invention relates to high speed generators and more especially to the rotating members of such machines.

The object of my invention is to improve and simplify the commutator type of high speed dynamo-electric machine, and render same particularly applicable for use in a three-wire direct current system of distribution in which a so-called three-wire generator of relatively small capacity is employed.

My invention is an improvement on the type of three-wire generator illustrated and described in the patent to Dobrowolsky, No. 513,006, granted Jan. 16, 1894.

The nature and application of the invention will be pointed out in the following specification.

In the accompanying drawings, Figure 1 is a diagram of a three-wire system embodying my invention. Fig. 2 is a sectional view along the line 2—2 of Fig. 3, in the direction indicated by the arrows; Fig. 3 is a sectional elevation of the commutator end of a dynamo-electric machine equipped with my invention; and Fig. 4 is a diagrammatic sketch showing the parallel arrangement of the reactance coils.

Referring now to the figures of the drawing, in which I have illustrated the preferred form of my invention as embodied in a three-wire generator, 10 is a shaft carrying an armature 11 and commutator 12. Rings 13 and 14 are provided primarily for the purpose of retaining the commutator bars 15 in place against the action of centrifugal and other forces, and as collector rings. These clamping rings should have a diameter such that after being heated, thus expanded, and slid over the commutator and being allowed to cool and contract, the rings will hold the commutator bars firmly in proper place. The rings are preferably made of steel or some other good conducting material which is strong and durable. These rings are connected by connectors through windings $27^b$ of reactance coils 27, in a manner to be hereinafter described, to bars of the commutator which are connected to points of the armature winding of opposite potential. In some instances, especially when the machine is of relatively small capacity, it is advantageous to have the reactance coils rotate with the armature. In this particular case the reactance coils 27, each comprising the laminated iron core $27^a$ and winding $27^b$, are located in annular grooves in the rings 13 and 14. These windings $27^b$ are connected in parallel, as shown diagrammatically in Fig. 4, between commutator bars of opposite potential. One end of each winding $27^b$ is connected to a commutator bar at $16^a$, and the other end of each winding is connected to another bar at $16^b$, the middle point of each winding being connected to one of the clamping rings at 16 (see Fig. 2 and 3). Any desired number of windings $27^b$ may be used in parallel and the terminal connections may be distributed around the armature winding in any order as long as the terminals of each winding $27^b$ are connected to points of the armature winding of opposite potential; in fact, the greater the distribution, the greater is the balancing effect in the armature winding itself.

Tracing the circuits of Figs. 1 and 4, it will be seen that brushes 18 and 19 feed the mains $18^a$ and $19^a$ of a three-wire system of distribution. The ends of the windings $27^b$ of reactance coils 27 are electrically connected to points of opposite potential in the armature winding, end portions of which are shown at 35, and the middle points of said windings $27^b$ to the clamping rings 13 and 14, which are in electrical contact with brushes 21 and 22 respectively. The neutral or compensating conductor 23 of the three-wire system of distribution connects in series the two consuming circuits 24 and 25, which contain, for instance, lamps $26^a$ and $26^b$.

By means of the arrangement herein illustrated and described a balanced voltage is maintained on the lamps of the three-wire system in a manner so well understood that it need not be further explained.

To prevent the reactance coils heating up excessively and endangering the insulation, I employ fans 29 made of sheet metal and bolted or otherwise fastened to the rings. The fans are radial and located at points circumferentially spaced around the rings. In addition to keeping the reactance coils cool they aid in cooling the commutator.

Many modifications of the precise arrangement here shown and described may be made without departing from the spirit and scope of my invention, and in the following claims I aim to cover my invention broadly.

What I claim as new is:

1. In the rotor of a dynamo-electric machine, the combination of a commutator consisting of a plurality of bars, a clamping ring mounted on said commutator, a core of magnetic material located in said ring, a coil mounted on said core, an armature winding connected to said commutator bars, the terminals of said coil being connected to the bars which are connected to points of said winding of opposite potential, and the middle point of said coil being connected to said ring.

2. In the rotor of a dynamo-electric machine, the combination of a commutator consisting of a plurality of bars, clamping rings mounted on said commutator, and reactance coils carried by said rings.

3. In the rotor of a dynamo-electric machine, the combination of a commutator consisting of a plurality of bars, clamping rings provided with annular grooves mounted on said commutator, and reactance coils occupying said annular grooves.

4. In the rotor of a dynamo-electric machine, the combination of a commutator consisting of a plurality of bars, clamping rings mounted on said commutator, an armature winding connected to said commutator, and inductive resistance connections joining said rings to the bars of said commutator which are in electrical connection with points of said armature winding of different potential.

5. In the rotor of a dynamo-electric machine, the combination of a commutator, rings provided with annular grooves mounted on said commutator, fans mounted on said rings, and reactance coils occupying said annular grooves.

6. In the rotor of a dynamo-electric machine, the combination of a commutator consisting of a plurality of bars, rings provided with annular grooves mounted on said commutator, fans mounted on said rings, and reactance coils occupying said annular grooves, said coils being connected in parallel and to certain of the bars of said commutator.

7. In the rotor of a dynamo-electric machine, the combination of a commutator consisting of a plurality of bars, a clamping ring mounted on said commutator, an armature winding connected to said commutator, and conductors including reactance coils which connect said ring electrically to bars of said commutator, which are connected to points of said winding of different potential.

8. In the rotor of a dynamo-electric machine, the combination of a commutator consisting of a plurality of bars, clamping rings provided with grooves and mounted on said commutator, laminated annular cores, and coils mounted on said cores occupying said grooves.

In testimony whereof I affix my signature, in the presence of two witnesses.

CHARLES E. LORD.

Witnesses:
CHAS. L. BYRON,
ROB. E. STOLL.